United States Patent [19]

Bowden et al.

[11] 4,422,164

[45] Dec. 20, 1983

[54] ON-BOTTOM SEISMOMETER ELECTRONIC SYSTEM

[75] Inventors: Edgar A. Bowden, Arlington; Gordon R. Deline, Carrollton; Gerard D. Koeijmans, Dallas, all of Tex.

[73] Assignee: Mobil Oil Corporation, New York, N.Y.

[21] Appl. No.: 163,757

[22] Filed: Jun. 27, 1980

[51] Int. Cl.$^3$ .......................... G01V 1/24; G01V 1/38
[52] U.S. Cl. ......................................... 367/15; 367/55
[58] Field of Search ....................... 367/15, 21, 47, 55; 364/421

[56] References Cited

U.S. PATENT DOCUMENTS

| 3,525,072 | 8/1970 | Born et al. | 367/21 |
|---|---|---|---|
| 3,535,501 | 10/1970 | Porter | 367/21 |
| 4,016,531 | 4/1977 | Cook et al. | 367/21 |
| 4,138,658 | 2/1979 | Avedik et al. | 367/15 |
| 4,224,474 | 9/1980 | Savit | 367/60 |

FOREIGN PATENT DOCUMENTS

| 879323 | 8/1971 | Canada | 367/60 |
|---|---|---|---|
| 1550518 | 8/1979 | United Kingdom . | |
| 602895 | 3/1978 | U.S.S.R. | 367/21 |

OTHER PUBLICATIONS

Steinmitz et al., "Coupling of a Strong Motion Ocean Bottom Seismometer", 5/3/79, pp. 2235-2250, OTC, 11th Annual OTC in Houston, Texas.
G. H. Sutton, et al., "Ocean-Bottom Seismic Observatories" Proc. of the I.E.E.E. vol. 53, No. 12 (Dec., 1965), pp. 1909-1921.
E. E. Davis, et al., "Seismic Structure of the Juan de Fuca Ridge: Ocean Bottom Seismometer Results from the Median Valley", Jour. of Geo. Rsch., vol. 81, No. 20 (Jul. 10, 1976), pp. 3541-3555.
B. T. R. Lewis et al., "Converted Shear Waves are Seen by Ocean Bottom Seismometers and Surface Buoys", Bull. of the Seismological Soc. of Amer., vol. 67, No. 5 (Oct. 1977), pp. 1291-1302.
J. G. Blackinton, et al., "An Ocean Bottom Seismograph Using Digital Telemetry and Floating-Point Conversion", IEEE Trans. on Geoscience Electronics, vol. GE-15, No. 2 (Apr. 1977), pp. 74-82.
R. B. Whitmarsh, "A Ocean Bottom Pop-Up Seismic Recorder", Marine Geophysical Researches 1 (1970), pp. 91-98.
C. R. B. Lister, et al., "An Ocean-Bottom Seismometer Suitably for Arrays", Deep-Sea Rsch., vol. 23 (1976), pp. 113-124.
R. V. Johnson II, et al. "A Direct Recording Ocean Bottom Seismometer", Marine Geophysical Researches 3 (1977), pp. 65-85.
R. A. Arnett, et al., "Ocean-Bottom Seismograph", Proc. of the I.E.E.E., vol. 53 No. 12 (Dec. 1965), pp. 1899-1905.
D. Carmichael, et al., "A Recording Ocean Bottom Seismograph", J. Geophys. Resch., vol. 78, No. 35 (Dec. 10, 1973), pp. 8748-8750.
R. B. Whitmarsh, "A Buoyant Seismic Recording Apparatus for Use on the Ocean Bed" I.E.R.E. Conf. Proc., vol. 8, (1968) Paper No. 28.
T. J. G. Francis, et al., "Ocean Bottom Seismograph", Marine Geophysical Researches 2 (1975), pp. 195-213.
T. J. G. Francis, et al., "Experience Gained with the Blacknest Ocean Bottom Seismograph", Marine Geophysical Researches 3 (1977), pp. 143-150.
S. H. Johnson, et al., "A Free-Fall Direct-Recording Ocean Bottom Seismograph", Marine Geophysical Researches 3 (1977), pp. 103-117.
Mattaboni et al., "MITOBS; A Seismometer System for Ocean-Bottom Earthquake Studies", Jun. 1976 revision submitted to Marine Geophysical Researches.
Avedik et al., "Ocean Bottom Refraction Seismograph (OBRS)", Marine Geophysical Researches 3 (1978), pp. 357-379.
Dr. T. F. Hueter, et al., "Acoustical Noise Measuring Buoy with Digital Data Recording", Marine Sciences Instrumentation (Inst. Society of America), vol. 1 (1962), pp. 21-24.
S. Thobe, "Low-Cost Earthquake Detection with Ocean-Bottom Seismograph", pp. 84-85.
W. A. Prothero, Jr., "A Free Fall Seismic Capsule for Seismicity and Refraction Work", Offshore Technology Conference, Dallas, Texas, May 3-6, 1976; No. OTC2440.
W. A. Prothero, Jr., "An Operationally Optimized Ocean Bottom Seismometer Capsule", University of California, Santa Barbara, prepared under Dept. of Commerce, NOAA Office of Sea Grant, Grant 04-5-158-20, Project USDC R/E-15.

A. K. Ibrahim, et al., "A Comparison Between Sonobuoy and Ocean-Bottom Seismograph Data and Crustal Structure of the Texas Shelf Zone" presented at 46th Annual Society of Exploration Geophysicists Meeting, Houston, Texas, Oct. 24, 1976.

G. Latham, et al., "The Texas Ocean-Bottom Seismograph" 10th Annual Offshore Technology Conference Meeting, Houston, Texas, May 8-11, 1978, OTC Paper No. 3223.

Preliminary draft of document AS on sheet 1 provided to Mobil Oil Research and Development Corp. on or about Feb. 6, 1978.

*Primary Examiner*—Nelson Moskowitz
*Attorney, Agent, or Firm*—Charles A. Huggett; Michael G. Gilman; F. J. Kowalski

[57] ABSTRACT

An ocean bottom seismometer unit records refraction waves from a seismic source. The refraction waves are digitzed and stored in a magnetic memory. Periodically, a tape recorder is started and digital samples are transferred from digital memory to tape during a time in which operation of the tape recorder will not generate spurious noise signals which interferes with the detection of the refraction waves. The water break is detected and the time of its occurrence is digitized. Only the digitized time of the water break occurrence is recorded thereby permitting shortened record length and increased record storage capacity.

14 Claims, 11 Drawing Figures

| FRAME n | 11 | 10 | 9 | 8 | 7 | 6 | 5 | 4 | HIGH ORDER BYTE |

| FRAME n+1 | 3 | 2 | 1 | 0 | $x_3$ | $x_2$ | $x_1$ | $x_0$ | LOW ORDER BYTE |

EXPONENT

Fig. 3A INITIALIZATION
Fig. 3B OPNL
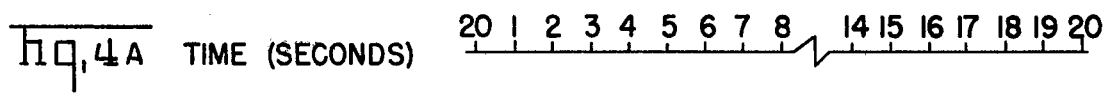
Fig. 4A TIME (SECONDS)
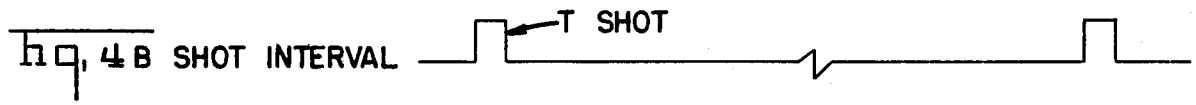
Fig. 4B SHOT INTERVAL
Fig. 4C RECORD INTERVAL
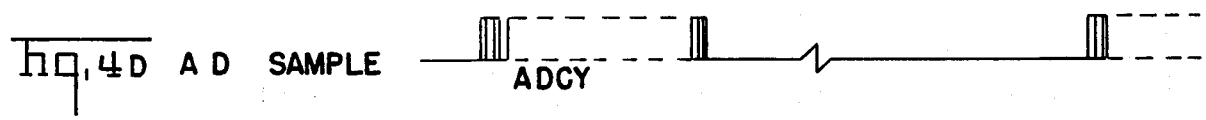
Fig. 4D A D SAMPLE
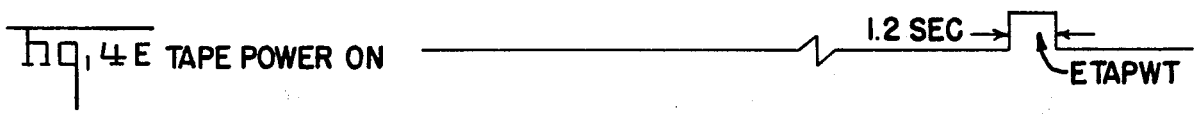
Fig. 4E TAPE POWER ON
Fig. 4F LISTEN FOR WATERBREAK

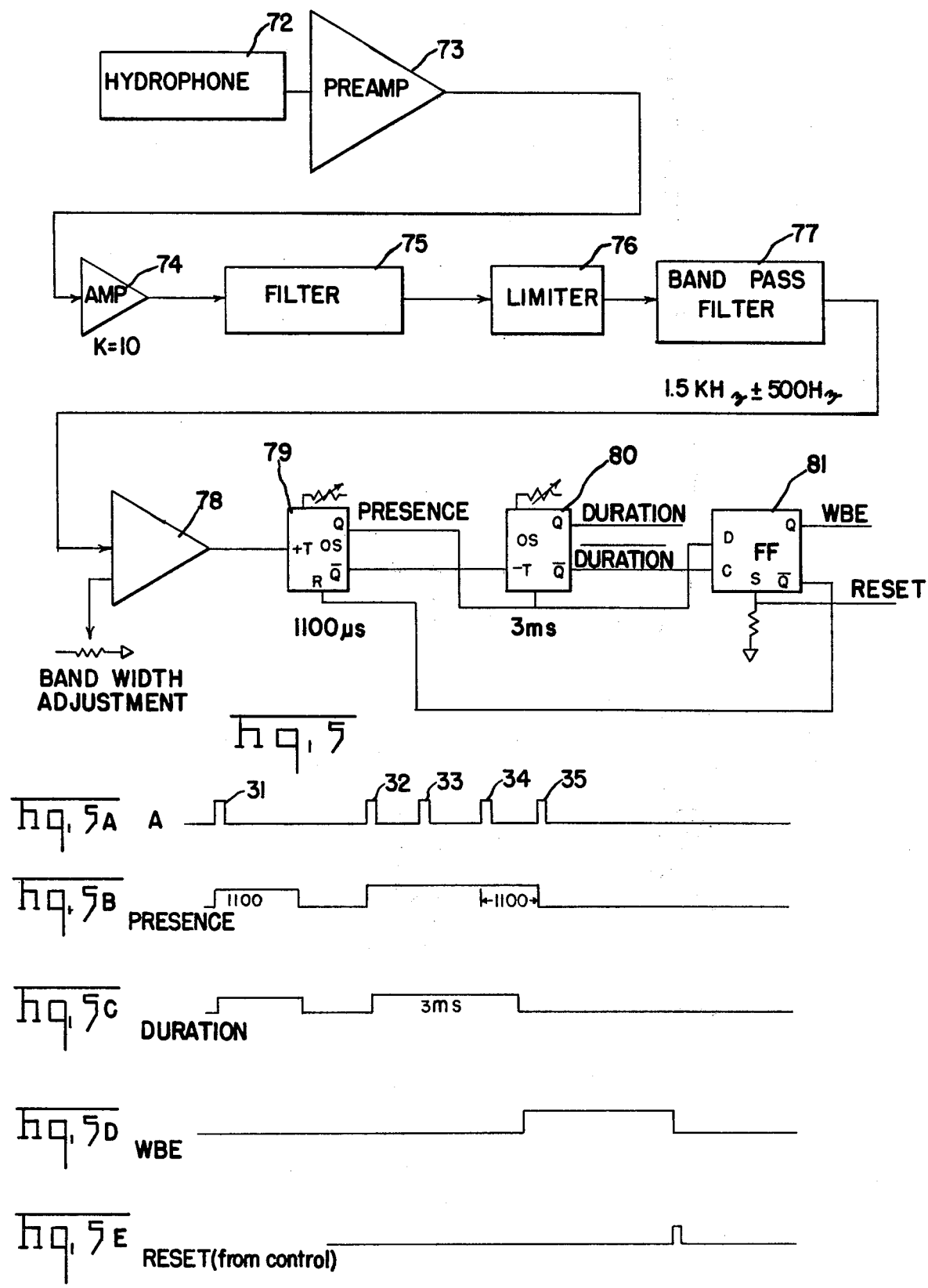

Fig. 6A  RSEC

Fig. 6B  RMSH

Fig. 6C  RMSL

Fig. 6D  RFF

| LOCATION | CONTENTS | REC NO. HEX / REC NO. DEC |
|---|---|---|
| 1C | WB1 S | 21 |
| 1D | MSH | 93 |
| 1E | MSL | 27 |
| 1F | WB2 S | 23 |
| 20 | MSH | 47 |
| 21 | MSL | 15 |
| 22 | WB3 S | FF |
| 23 | MSH | |
| 24 | MSL | |
| 25 | WB4 S | |
| 26 | MSH | |
| 27 | MSL | |
| 28 | WB5 S | |
| 29 | MSH | |
| 2A | MSL | |
| 2B | WB6 S | |
| 2C | MSH | |
| 2D | MSL | |
| 2E | WB7 S | |
| 2F | MSH | |
| 30 | MSL | |
| 31 | WB8 S | |
| 32 | MSH | |
| 33 | MSL | |
| 34 | WB9 S | |
| 35 | MSH | |
| 36 | MSL | |
| 37 | WB10 S | |
| 38 | MSH | |
| 39 | MSL | |
| 3A | WB11 S | |
| 3B | MSH | |
| 3C | MSL | |
| 3D | WB12 S | |
| 3E | MSH | |

Fig. 7

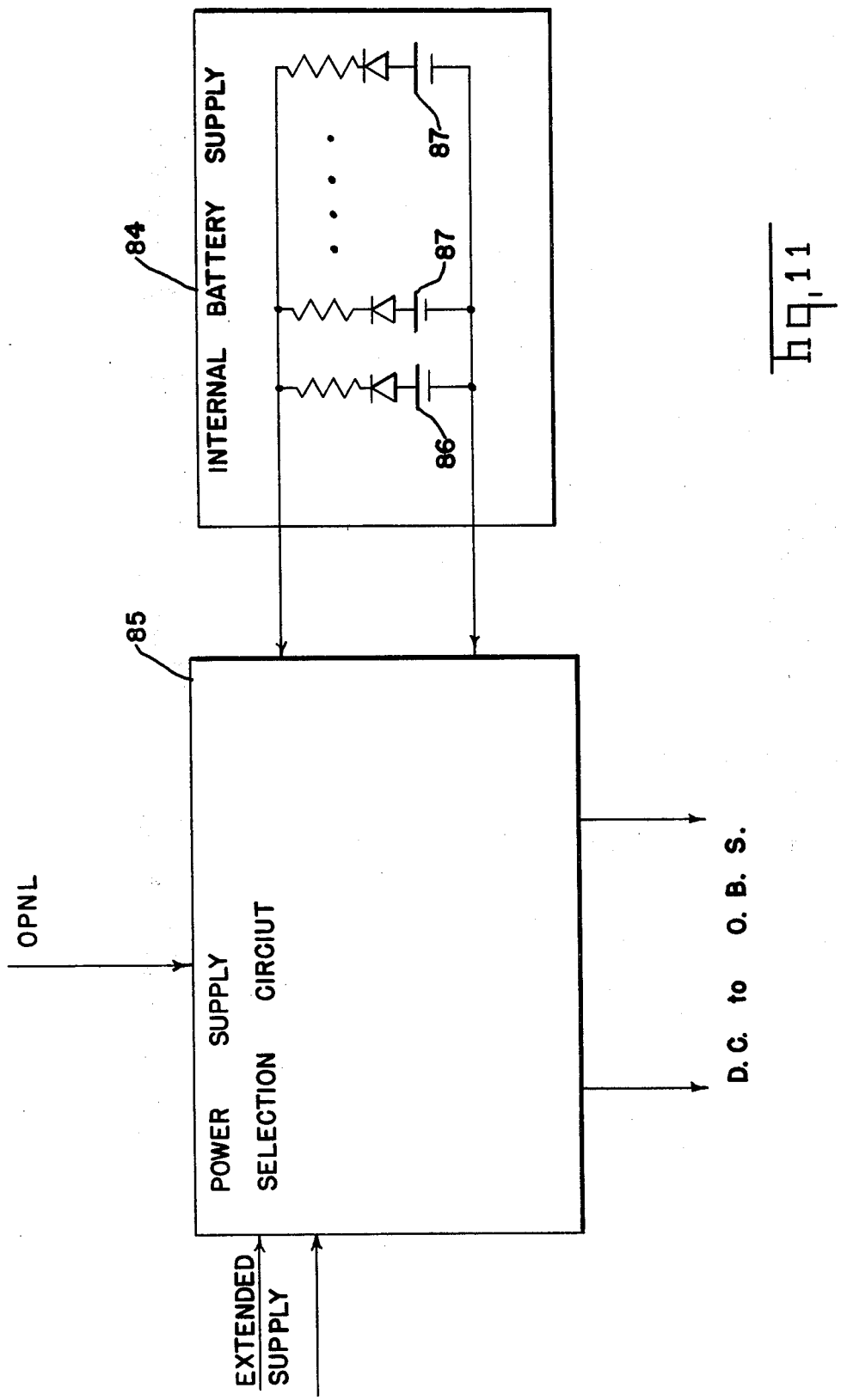

ON-BOTTOM SEISMOMETER ELECTRONIC SYSTEM

BACKGROUND OF THE INVENTION

This invention relates to an on-bottom seismometer system and, more particularly, to a system which will record seismic data and water break arrivals from repetitive seismic pulses.

T. J. G. Francis et al, Ocean Bottom Seismograph Marine Geophysical Researches (1975), 195-213, describe three ways of retrieving seismic information from the ocean floor. A self-contained instrument may be attached by a rope to a surface ship or buoy; a transducer package may telemeter its data to a surface ship buoy or land station for recording; and a completely independent instrument of the "pop up" type may record data in its self-contained memory. The latter type instrument has been referred to as an on-bottom seismometer. These instruments have the advantage that they are easier to place on a particular bottom feature; the instrument is more secure from being tampered with than one which is connected to a surface buoy; and less system generated noise is associated with this type of instrument than one employing a mooring or a telemetry link.

On-bottom seismometers have been extensively used to record explosion and earthquake data. Prothero, "A Free Fall Seismic Capsule for Seismicity and Refraction Work", Offshore Technology Conference Paper No. OTC2440, prepared for presentation at the 8th Annual Offshore Technology Conference, Houston, Texas, May 3-6, 1976; and, "An Operationally Optimized Ocean Bottom Seismometer Capsule", (Work sponsored by NOAA office of Sea Grant, under Grant 04-5-158-20), describe on-bottom seismometers which were developed at the University of California, Santa Barbara. In the former seismometer digital samples of seismic data are passed through a delaying shift register; in the latter seismometer they are stored in a microprocessor. When the amplitude of the signals is above the noise level in either seismometer, a tape recorder is started and the samples are transferred to magnetic tape.

Attempts to use on-bottom seismometers for refraction surveys have generally used a continuously running tape recorder to record the data. Avedik et al, "Ocean Bottom Refraction Seismograph (OBRS)", Marine Geophysical Researches 3 (1978), 357-379, describe an ocean bottom seismometer used for refraction surveys. In this system the seismic data are encoded with pulse width modulation. A tape recorder is set to start and stop by a programmer synchronized with the ship-borne seismic programmer. As best shown in FIG. 8, the recorder is running during the time that the seismic signal is being detected. U.S. Pat. No. 4,138,658, Avedik et al, discloses and claims some features of this unit.

Johnson et al, "A Direct Recording Ocean Bottom Seismometer", Marine Geophysical Researches 3 (1977), 65-85, describe another system using a continuously running tape recorder.

One problem associated with such tape recorders is the noise generated by the tape drive motor. If the tape recorder is running during the time that the seismic signals are being detected, this noise is mixed with the signal. Another problem with continuously running tape recorders is that only a limited number of seismograms can be recorded with good resolution. If the tape is run at very low speeds, more seismograms can be recorded, but the resolution is poor.

It is desirable to provide an ocean-bottom seismometer which can record a large number of refraction seismograms produced in response to repetitive shots of seismic energy. A system for producing repetitive pulses of seismic energy from air guns is shown, for example, in the Ritter U.S. Pat. No. 3,687,218.

It is desirable to record these refraction seismograms in the format of conventional reflection seismograms with header information and the time of arrival of the water break. The water break is the arrival of the direct traveling wave at the seismometer. This wave travels from the source to the ocean bottom through the water. The water break comes in later as the boat with the seismic source steams away from the seismometer. Because of this, prior art techniques for recording refraction seismograms including th water break, have required an exceedingly long record length. This limits the number of seismograms which can be recorded on a given magnetic tape.

SUMMARY OF THE INVENTION

In accordance with the present invention, an ocean bottom seismometer records seismograms in a refraction survey in which repetitive pulses of seismic energy are produced.

In carrying out the invention, the seismic signals are converted to digital samples which are stored in a digital memory. After the seismic energy has been detected, a tape recorder is started and the digital samples are transferred from memory to the tape. The system operates in a repetitive cycle which is synchronized with the generation of the seismic pulses. For each seismic pulse generated, the detected seismic energy is converted to a digital sample and the digital samples are transferred to tape after the detection of the seismic energy. This technique decreases the noise in the recorded signal. The tape recorder is turned off before the next seismic pulse and does not generate noise which will interfere with the recording of refraction waves from this pulse.

In accordance with an important aspect of this invention, the time of arrival of the water break signal is digitized and recorded. This obviates the necessity of having a record length which is sufficiently long to record the arrival of the water break. By shortening the time length of the seismic records in this manner, the capacity of the tape recorder for recording seismograms is very much increased.

The foregoing and other objects, features and advantages of the invention will be better understood from the following more detailed description and appended claims.

SHORT DESCRIPTION OF THE DRAWINGS

FIGS. 3A and 3B are wave forms depicting the operation of the system;

FIGS. 4A-4F are wave forms depicting the operation between two shot intervals;

FIG. 5 is a block diagram of the water break detection circuit;

FIGS. 5A-5E are wave forms depicting the operation of the water break detector;

FIGS. 6A–6D are wave forms depicting its operation;

FIG. 7 depicts the format of the water break data;

FIG. 11 shows the power supply for the unit.

In accordance with the invention a determination is made of which signals meet the criteria of a valid water break. The times of all valid water break signals are digitized and recorded. Later consideration of all recorded water breaks will show the true water break pattern whereas some true water breaks may be missing if only one is recorded for each seismic pulse.

DESCRIPTION OF THE SPECIFIC EMBODIMENT

Figures 1, 10:
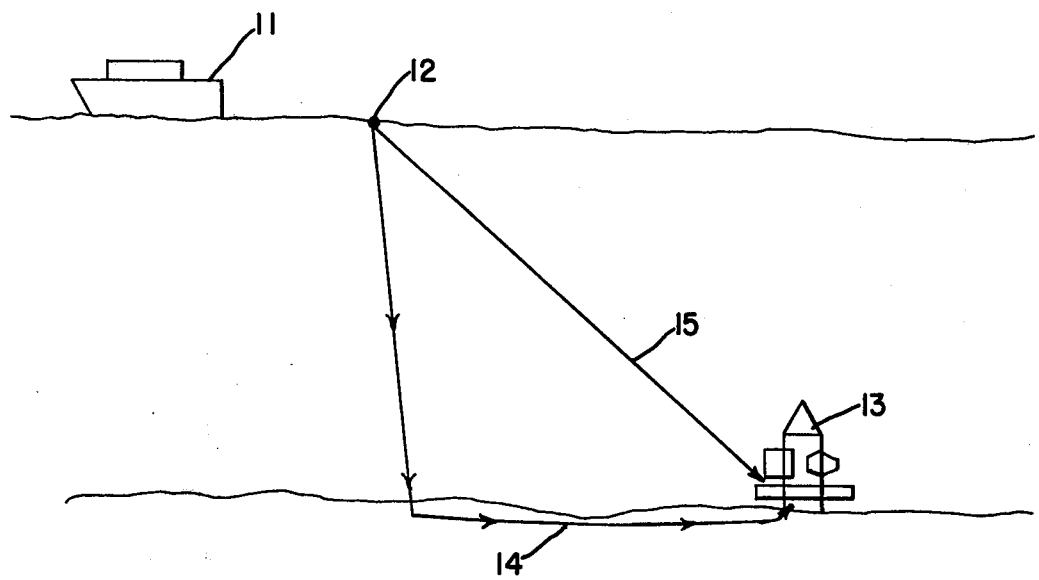
FIG. 1 depicts an on-bottom seismometer together with a refraction ray path and a water break path from a source to the seismometer.
FIG. 10 shows the data word format.

Referring to FIG. 1, an exploration vessel 11 tows a source of seismic pulses 12. Typically, this source and its control system may be of the type disclosed in the aforementioned Ritter patent wherein an array of airguns is used to periodically produce pulses of seismic energy. Typically, the exploration vessel 11 tows a streamer of hydrophones which detect seismic energy reflected from the subsurface.

An on-bottom seismometer is depicted at 13. This on-bottom seismometer contains a geophone which detects refraction waves such as that indicated at 14. A refraction survey includes records of the detection of the refraction waves for each shot of seismic energy. After a number of such refraction records have been recorded, an acoustic command actuates a release so that on-bottom seismometer 13 returns to the suface. There it is retrieved and the tape recorded records are processed.

In a refraction survey, it is desirable to record the arrival time of the water break signal produced by the seismic energy which travels directly through the water along the path 15. Because the seismic energy travels more slowly through the water, this signal may occur much later than the arrival of the refraction waves depending upon vessel location.

Figure 2:
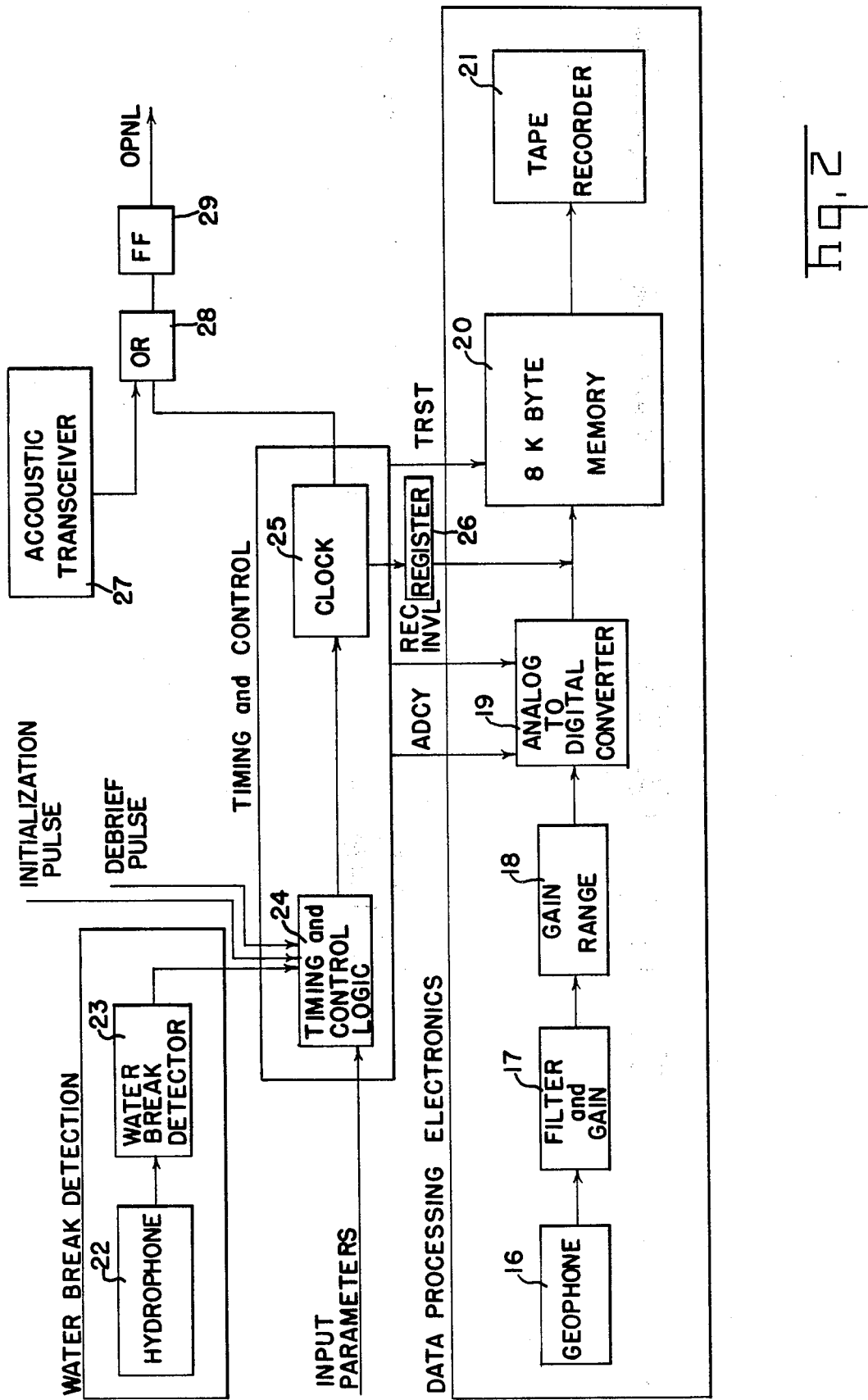
FIG. 2 is a block diagram of the present invention.

FIG. 2 shows a block diagram of the on-bottom seismometer of this invention. A geophone 16 (or geophones) produces a signal representing the detection of the refraction waves. Conventional filter and gain changing circuits 17 and gain range circuitry 18 shape the seismic signal to be recorded. This seismic signal is sampled at a preselected rate (once every 4 milliseconds in the example being discussed) and the samples are digitized in the analog to digital converter 19. These digital samples are stored in memory 20 as they are produced. After the refraction waves have been detected and digitized, tape recorder 21 is turned on and the digital samples from memory 20 are transferred to the tape recorder 21. Also transferred to the tape recorder 21 are digital samples representing header information. This includes the usual information recording time and location and it includes a digitized sample representing the time of the water break.

The water break is detected by hydrophone 22. Water break detector 23 separates the water break from other noise detected by hydrophone 22. Timing and control logic 24 and clock 25 generate the signals producing the header information, including water break time, and transfer the digital samples from memory 20 to tape recorder 21. A register 26 receives the digital samples from timing and control logic 24 and clock 25 and stores them until they can be inputted into the memory 20 at the proper storage location.

Before the on-bottom seismometer is deployed, it is rendered operational in response to an output of the clock 25. At a predetermined time, clock 25 acts through gate 28 and flip flop 29 to generate the signal OPNL. This controls the application of power to the seismometer unit. Alternatively, the unit can be rendered operational in response to an acoustic pulse from the exploration vessel. Such an acoustic pulse is detected by the acoustic transceiver 27 which acts through gate 28 to set the flip flop 29. All timing is carried out with respect to an initialization pulse which is generated aboard the vessel prior to deployment. After the on-bottom seismometer has been retrieved a debrief pulse is applied to timing and control logic 24. The times recorded by the internal clock circuitry can be compared to the actual time represented by the debrief pulse to determine how accurately the timing and control logic performed during deployment.

The operation of the system can be summarized with reference to the wave forms of FIGS. 3 and 4. The ocean bottom seismometer is initialized on board ship before being deployed on the ocean bottom. As shown in FIG. 3A, an initialization pulse synchronizes the electronic circuitry of the ocean bottom seismometer with the times of firing of the seismic guns. After this initialization pulse, the ocean bottom system is in a STANDBY MODE during which it is deployed. At the START TIME the ocean bottom system is switched into a DATA ACQUISITION MODE, during which time it is in condition to detect and record refraction records. If the unit is not released by acoustic commands, at a predetermined time determined by a clock, the ocean bottom seismometer is automatically released to the suface where it is retrieved.

FIGS. 4A–4F depict a typical shot interval where the interval between shots is 20 seconds and a 6 second refraction record is recorded. FIG. 4A represents the seconds in the shot interval. FIG. 4B shows the pulses designated T SHOT which are 20 seconds apart and which coincide with the time of the shot. After each shot, there is a 6 second record interval shown in FIG. 4C during which the signal from the geophone is sampled and digitized. FIG. 4D indicates the sampling interval. FIG. 4F shows the interval during which the water break detection is enabled. In the specific example under consideration, the system is capable of detecting a water break which occurs anywhere up to 18 seconds after the shot. (It is possible to detect beyond 18 seconds.) The record lengths are programable, in this example, only 6 seconds long. This results in a considerable increase in the capacity for records. If the record length were long enough to record water breaks, far fewer records could be recorded on the same tape. As depicted in FIG. 4E the power for the tape recorder is turned on after 18 seconds. During a 1.2 second interval the header information and digitized samples are transferred to 9 track magnetic tape.

The system is shown in more detail in FIGS. 5–8. FIG. 5 shows the details of the water break detection circuit. Referring to FIG. 5, water disturbances are monitored by hydrophone 72 and examined for proper frequency and duration by the water break detection circuitry. If the disturbance satisfies the requirements for a water break, the time of the occurrence is written into memory 20. Preamp 73 and amplifier 74 provide the necessary gain. Filter 75 is a high pass filter. Limiter 76 produces an output of +5 or 0 volts. This limiter converts the water break into square waves. Pass filter 77 has a pass band centered near the waterbreak signal frequency. Comparator 78 compares the incoming signal to a threshold. If it is above the threshold it triggers a retriggerable monostable multivibrator 79 which has a duration of 1.1 milliseconds. One of the outputs of multivibrator 79 triggers the one shot multivibrator 80 which has a period of 3 milliseconds. If the output of multivibrator 79 is still up at the end of the period of one shot multivibrator 80, the flip flop 81 is set. This signifies the presence of a water break signal WBE.

Monostable multivibrators 79 and 80 and flip flop 81 form a circuit which detects the presence of at least three pulses, or excursions. These three excursions are the minimum number of events which are normally present in a water break signal. This discriminates against a spurious pulse of the right frequency content triggering the water break detector. If there are at least three excursions, the flip flop 81 is set, signifying a water break event. When a water break event occurs, the Q output of flip flop 81 disables the monostable multivibrator 79.

The operation of the circuit FIG. 5 can be better understood with reference to FIGS. 5A-5E. The output of comparator 78 is shown in FIG. 5A; the Q output of multivibrator 79 is shown in FIG. 5B; the Q output of multivibrator 80 is shown in FIG. 5C; the Q output of flip flop 81 is shown in FIG. 5D and the reset pulse is shown in FIG. 5E. The pulse 31 from comparator 78 triggers multivibrator 79 and multivibrator 80. However, it does not generate a water break event signal (WBE) because there was not a repetition of the triggering during the 3 millisecond time that the multivibrator 80 was triggered. However, the pulses 32, 33 and 34 do result in the production of a valid water break signal. The pulse 35 does not retrigger the multivibrators 79 or 80 because multivibrator 79 is disabled during this time. The flip flop 81 is reset by a pulse from the timing and control circuit and is to be subsequently described.

Figure 6:
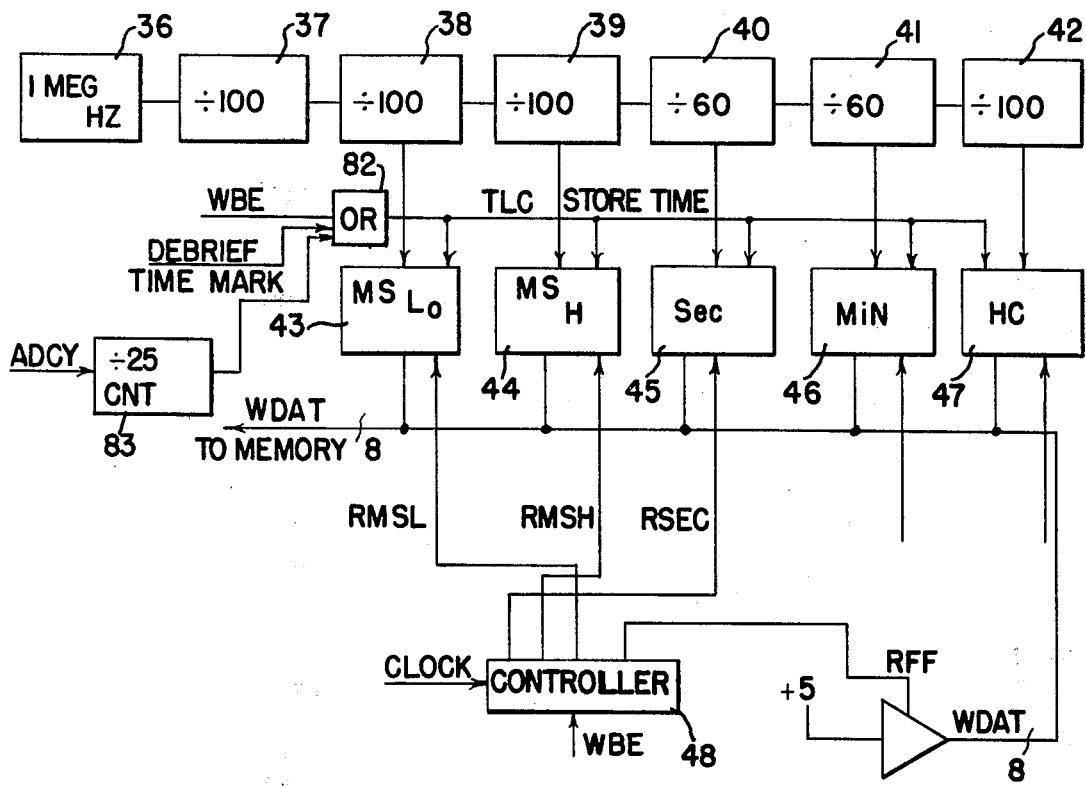
FIG. 6 is a block diagram of the clock circuitry.

FIG. 6 shows the clock circuit. The basic clock 36 is a 1 MHz crystal. The output is applied to serially connected counters 37-42. These counters are started at the initialization. The pulse outputs of counters 38 and 39 represent milliseconds, low and high order respectively. The pulse output of counter 40 represents seconds, the pulse output of counter 41 represents minutes, and the output of counter 42 represents hours. 8-byte registers 43-47 receive the pulse outputs of counters 38-42 respectively. These 8-byte registers contain a count representing the time after initialization time. The registers 43-47 make up the register 26 shown in FIG. 2. A digital time sample is stored in registers 43-47 until it can be transferred to memory.

The time latch control (TLC) signal updates the contents of all 8-byte registers 43-47. When a water break event (WBE) occurs, the contents of milliseconds and seconds registers, 43-45 are outputted to the write data bus. When a water break event occurs, controller 48 is enabled to produce the signals RSEC, RMSH, RMSL and RFF. These signals are shown in FIGS. 6A-6D respectively. These signals cause the contents of registers 43-45 to be applied to the write data bus, (WDAT).

The format in which digitized water break times are stored in memory 20 is shown in FIG. 7. Assume that two water breaks were detected, one occurring at 21.9327 seconds and one occurring at 23.4715 seconds. The digits 21 are written into memory location 1C, the digits 93 are written into memory location 1D; the digits 27 are written into memory location 1E. The letters FF are written into memory location 1F after the first water break write. This indicates detection of a valid water break. Upon detection of the next valid water break the letters FF in location 1F are written over by the digits 23. Digits 47 are written into memory location 20, digits 15 are written into memory location 21 and the letters FF are written into memory location 22. The appearance of the letters FF indicates that there are no further valid water breaks. The portion of header memory depicted in FIG. 7 has memory locations for 12 water breaks.

The first twenty-eight bytes of the header contain information related to the record such as date, time, crew number, line number, OBS unit number, and schedule information. The remainder of the 64 byte header contains a time record of events that appear to be water break events. The time of arrival of the water break is recorded in seconds to the nearest tenth of a millisecond. Three bytes of data are written for each water break event. A maximum of 12 water break type events can be recorded in the header. By recording the times of all apparently valid detected water breaks it is posible for the interpreter to later discern a pattern of true water breaks. Water break events occur in a consistent pattern and it is possible for the interpreter to determine this pattern if the times of all valid water breaks are recorded. The present invention provides the capability for recording the times of all valid water breaks.

Referring again to FIG. 6, the registers 43-47 are used to temporarily store the time of the debrief pulse until this digital sample can be recorded. The debrief pulse acts through gate 82 to set the time of the debrief pulse into the registers 43-47 from which the contents are transferred to memory 20.

In accordance with a feature of this invention, timing marks are recorded on each of the refraction records in a manner similar to the recording of timing marks on seismic signals. In the example under consideration, a timing mark is inserted into the data field every 100 milliseconds.

The last water break event recorded in a particular record is followed by the characters FF. The remainder of the header field will not be cleared of previous header writes, and will be irrelevant.

Figure 8:
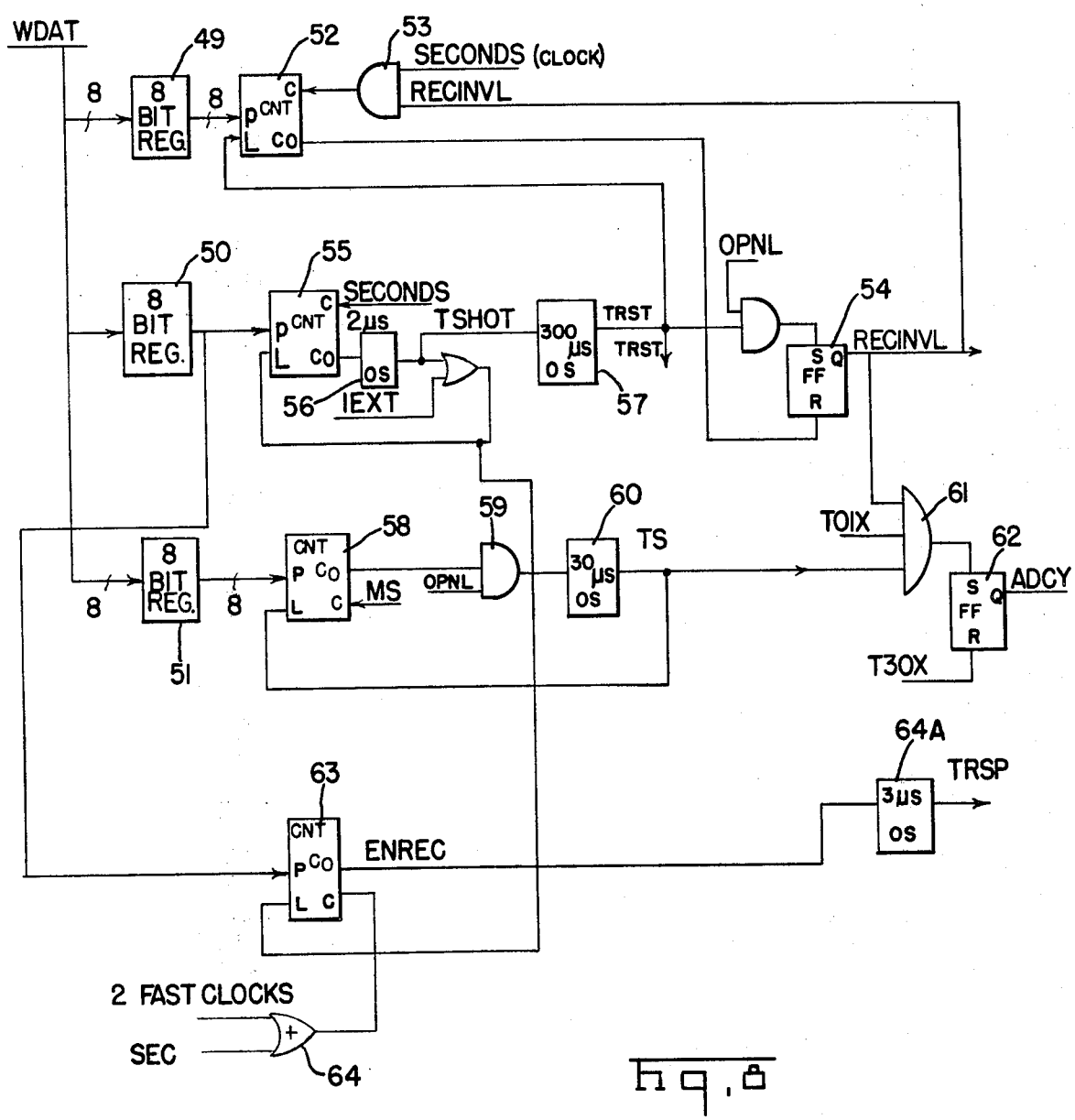
FIG. 8 is a block diagram of the timing and control circuitry.

FIG. 8 shows the timing and control logic which generates the signals for digitizing the refraction records, transferring the digitized samples to memory, turning on the tape recorder, and transferring the digital samples from memory to tape. 8-bit register 49 is loaded during initialization with the record length, which in this case is six seconds. 8-bit register 50 is loaded during initialization with the shot interval which is in this case 20 seconds. 8-bit register 51 is loaded during initialization with the sampling rate which in this case is 4 milliseconds.

After each shot (every 20 seconds in this example), the down counter 52 is loaded with the contents of register 49. Counter 52 is counted down by the seconds output of the clock, which is applied through gate 53. Flip flop 54 is set at the start of the shot interval and it is reset when the counter is counted down to zero. The Q output of flip flop 54 is the signal RECINVL which is up for the length of the record interval, in this case 6 seconds. The signal RECINVL enables the analog to digital converter 19 (FIG. 2).

The down counter 55 is initially loaded from the register 50 by the initialization pulse, IEXT, which is shown in FIG. 3A. Thereafter, the contents of register 50 are transferred to counter 55 at the start of every 20 second interval. Counter 55 is counted down by the seconds output of the clock. Every 20 seconds the counter 55 is counted down to zero. The $C_o$ output triggers the one shot multivibrator 56 which produces the T SHOT signal shown in FIG. 4B. This one shot in turn triggers one shot multivibrator 57 which produces the signal TRST which loads counter 52 and sets flip flop 54 as previously described.

The signal TRST also enables memory 20 (FIG. 2) to receive an update of the header information.

Counter 58 is loaded with the contents of register 51 every 4 milliseconds. Counter 58 is counted down by the millisecond output of the clock. The output of counter 58 is applied through gate 59 to the one shot multivibrator 60 which produces the signal TS. This signal is ANDED with the signal RECINVL in the gate 61. This sets the flip flop 62 which produces the signal ADCY (shown in FIG. 4D).

The down counter 63 is loaded with the shot interval from register 50 at the same time that the counter 55 is loaded. The tape recorder in this example is started two seconds before the end of the shot interval so as to completely record the data stored in the 8K byte memory 20 before the next shot. Therefore, two clock pulses are added through gate 64 to advance counter 63 by two counts. Because of this, the signal ENREC is produced 2 seconds before the end of the shot interval. This triggers the one shot multivibrator 64A which produces the signal TRSP. This starts the tape recorder as will be described with reference to FIG. 9.

In accordance with an important feature of the present invention, the registers 49, 50 and 51 are loaded with programmable representations of shot time interval, sampling interval and record length respectively. In this manner, any selected shot time interval, sampling interval or record length can be selected.

The tape recorder 21 (FIG. 9) may be a conventional high density recorder. One example which is suitable for use is the Genisco ECR 10 which can record the data in the 8K byte memory 20 in less than 2 seconds.

Figure 9:
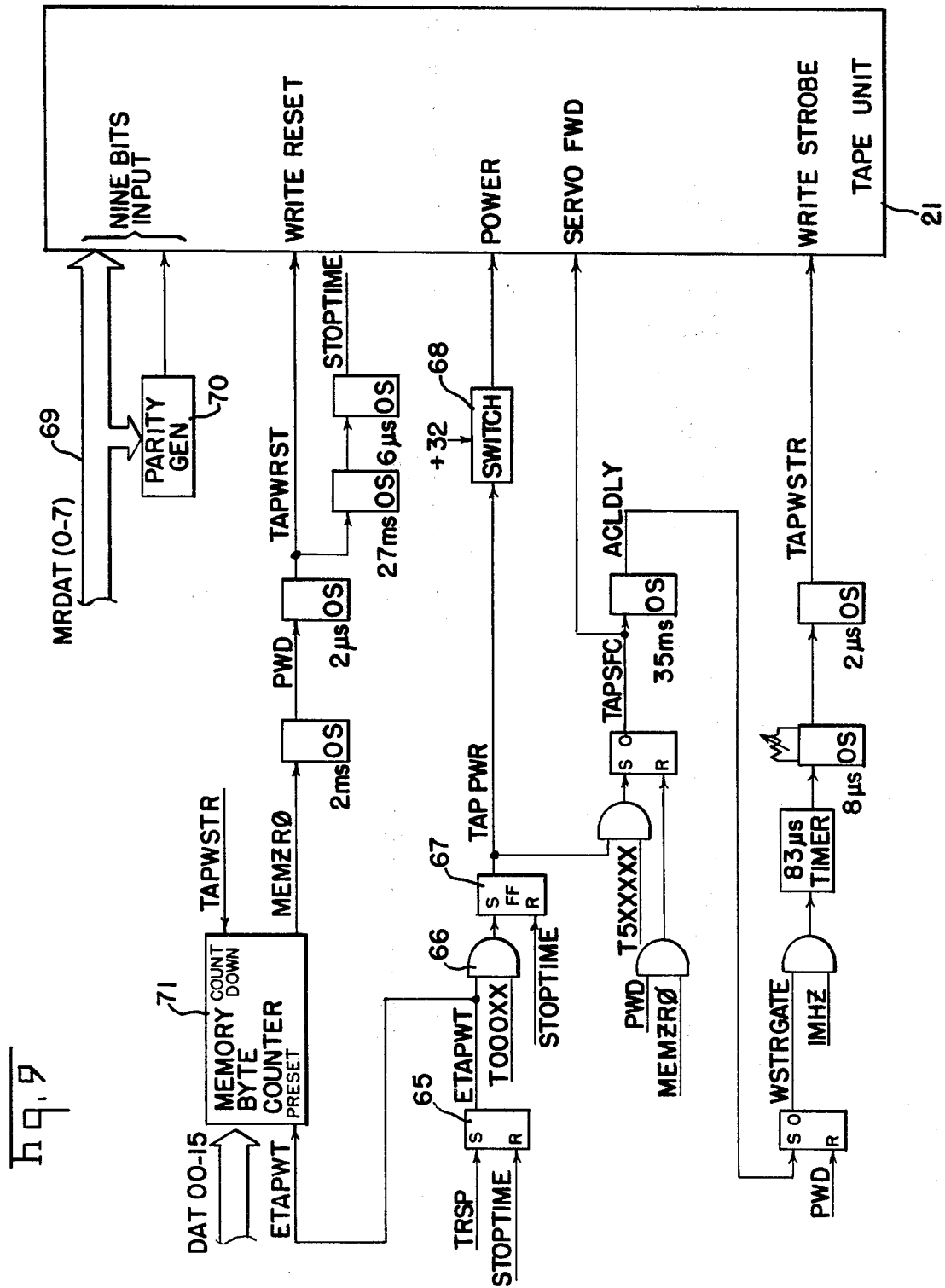
FIG. 9 is a block diagram of the tape recorder control circuitry.

The signal TRSP from FIG. 8 sets the flip flop 65 in FIG. 9 to generate an enable tape write signal, ETAPWT. This acts through gate 66, flip flop 67, and switch 68, to turn on the power.

The output of memory 20 (FIG. 2) is on the 8-bit bus 69. A parity bit is generated by parity generator 70 as is conventional. The 8 bits plus parity are recorded each time the WRITE STROBE input is enabled. This input is enabled by the signal TAPWSTR which is generated every 83 microseconds after the memory to tape transfer is initiated.

The address in memory 20 (FIG. 2) of the last byte written is set into the memory byte counter 71. Every time the signal TAPWSTR occurs, this counter is counted down. Counter 71 keeps track of the number of bytes transferred into the tape recorder. When an entire record has been transferred to the tape recorder it is turned off by circuitry which responds to a 0 count, MEMZRO, from counter 71.

Data is recorded on tape in two bytes per sample, formatted as in FIG. 10. The mantissa is in 2's complement format where bit 11 is the sign and bit 0 is the least significant bit. The exponent is an unsigned magnitude where bit $X_0$ is the least significant bit. The maximum length of a data record is 8192 bytes, the capacity of the 8K byte memory 20.

FIG. 11 shows the power supply for the on-bottom seismometer unit. It includes an internal battery supply 84 and a power supply regulator circuit 85. The unit operates from the internal battery supply 84 when the unit is deployed. During warm-up and initiation, the power buses are automatically switched to the exploration vessel. The power supply regulator circuit 85 selects the highest voltage available. Therefore, when the external supplies are removed, the unit buses are switched to the battery supply 84. The power supply regulator circuitry also responds to the operational command OPNL to render all circuits in the unit operational.

Eight parallel strings of cells make up the low voltage battery, the strings 86, 87, and 88 being shown. Each string has a diode and a resistor in series with it to prevent failure of the entire battery should a single cell short.

While a particular embodiment of the invention has been shown and described, various modifications are within the true spirit and scope of the invention. The appended claims are, therefore, intended to cover all such modifications.

We claim:

1. An ocean bottom seismometer unit for recording waves traveling from a source of seismic pulses comprising:
   a hydrophone producing signals representing water break waves arriving at said hydrophone through the water from said source;
   a water break detector responsive to said hydrophone signals producing a water break signal representing the arrival of said water break waves at said hydrophone;
   means for digitizing the time of occurrence of said water break waves at said hydrophone;
   means for digitizing the time of occurrence of said water break signal;
   a digital memory;
   means for storing a plurality of said digitized water break signal times in said digital memory before recording them on said magnetic tape recorder unit whereby an array of digitized water break signal times are stored in said memory after each seismic pulse;
   a magnetic tape recorder unit and;
   timing and control means for starting said magnetic tape recorder unit and ransferring said digitized water break signal times from said digital memory to said recorder unit for recording after the occurrence of a seismic pulse and stopping said magnetic tape recorder unit after the recording of said digitized water break signal times and before the occurrence of the next seismic pulse.

2. The seismometer unit recited in claim 1 wherein said water break detector comprises:
   a filter receiving said hydrophone signals which passes a signal having the frequency content of said hydrophone signal; and
   logic circuitry responsive to the output of said filter and producing a water break signal representing the arrival of said waves at said hydrophone upon the occurrence of a plurality of repetitions of said filter output signals having the frequency content of a water break.

3. The seismometer unit recited in claim 1 wherein said means for digitizing comprises:
a clock circuit having a source of clock pulses and a digital counter responsive to said clock pulses for producing a digital signal representing time; and
means responsive to said water break signal for transferring said digitized water break signal time from said digital counter to said digital memory.

4. The seismometer unit recited in claim 3 wherein said means responsive to said water break signal includes:
a digital register, the output of said digital counter being applied to said digital register in response to said water break signal so that said digitized water break signal time is stored in said register; and
means for transferring said digitized water break signal time from said register to said digital memory.

5. The seismometer unit recited in claim 4 wherein said means for digitizing further includes:
means for generating a digital signal to be stored in said array indicating the detection of a valid water break; and
means for transferring said last named signal to said digital memory after the transfer of said digitized water break signal time for storing in said array.

6. The seismometer unit recited in claim 4 wherein said clock circuit is synchronized with an initial pulse before said seismometer unit is deployed and wherein a debrief pulse is applied to said timing and control means after said seismometer is retrieved, said timing and control means including means responsive to said debrief pulse to store a digital signal representing the time of said debrief pulse in said digital register and to transfer the contents of said digital register to said digital memory and then to said recorder unit for recording whereby the recorded debrief pulse time can be compared to the actual time represented by said debrief pulse to determine the accuracy of said timing and control means.

7. The seismometer unit recited in claim 1 further comprising:
a geophone producing signals representing refraction waves traveling from said source of seismic pulses through the ocean subbottom to said seismometer unit, and
an analog to digital converter connected to the output of said geophone for converting said geophone signal to digital samples, said samples being outputted to said digital memory for storage before recording; wherein said timing and control means further includes means for transferring said digital samples with said array of digitized water break signal times in a refraction record to said magnetic tape recorder unit for recording after the detection of said refraction waves.

8. The seismometer unit recited in claim 7 further comprising:
means for periodically transferring the contents of said digital register to said digital memory to record timing marks in the data field of each of said refraction records.

9. An ocean bottom seismometer unit for recording waves traveling from a source of repetitive seismic pulses comprising:
means for detecting a water break time and producing an output signal in response thereto;
an analog to digital converter connected to the output of said means for detecting and converting said output signal to digital samples in a refraction record;
means for recording said record; and
timing and control means for disabling said means for recording at predetermined intervals including a clock circuit producing clock pulses, a digital counter responsive to said clock pulses and a digital register containing a digital representation of a time period after which a task controlled by the timing and control means must be repeated, the contents of said register being periodically transferred to said digital counter and said clock pulses being applied to said digital counter so that it periodically outputs a signal to control the performance of said task.

10. The seismometer unit recited in claim 9 wherein said digital register is loaded with a digital representation of the sampling interval of said analog to digital converter and said digital counter output signal is periodically produced at the sampling interval of said analog to digital converter and is applied to said analog to digital converter to control the production of digital samples.

11. The seismometer unit recited in claim 9 wherein said digital register is loaded with a digital representation of the record interval for recording samples of said refraction waves and said digital counter output signal is periodically produced at the end of the record interval during which said analog to digital converter converts the output of said means for detecting to digital samples and is applied to said analog to digital converter to control the length of time during which said digital samples are produced.

12. The seismometer unit recited in claim 9 wherein said digital register is loaded with a digital representation of the time interval between said repetitive seismic pulses, said digital counter output signal is periodically produced representing the occurrence of said seismic pulses, and said digital samples are transferred from said digital memory to said means for recording in synchronism with the occurrence of said last named signal.

13. The seismometer unit recited in claims 9, 10, 11 or 12 wherein said digital register is loaded with programmable digital representations so that a selected time interval can be provided.

14. The seismometer unit recited in claim 9 further comprising:
a self-contained power supply for said unit;
an acoustic transceiver for receiving acoustic commands; and
logic and circuitry means for rendering said seismometer unit operational after deployment in response to an acoustic command.

* * * * *